(No Model.) 3 Sheets—Sheet 1.
W. C. BAYLESS.
STRAW CUTTER.
No. 404,379. Patented June 4, 1889.
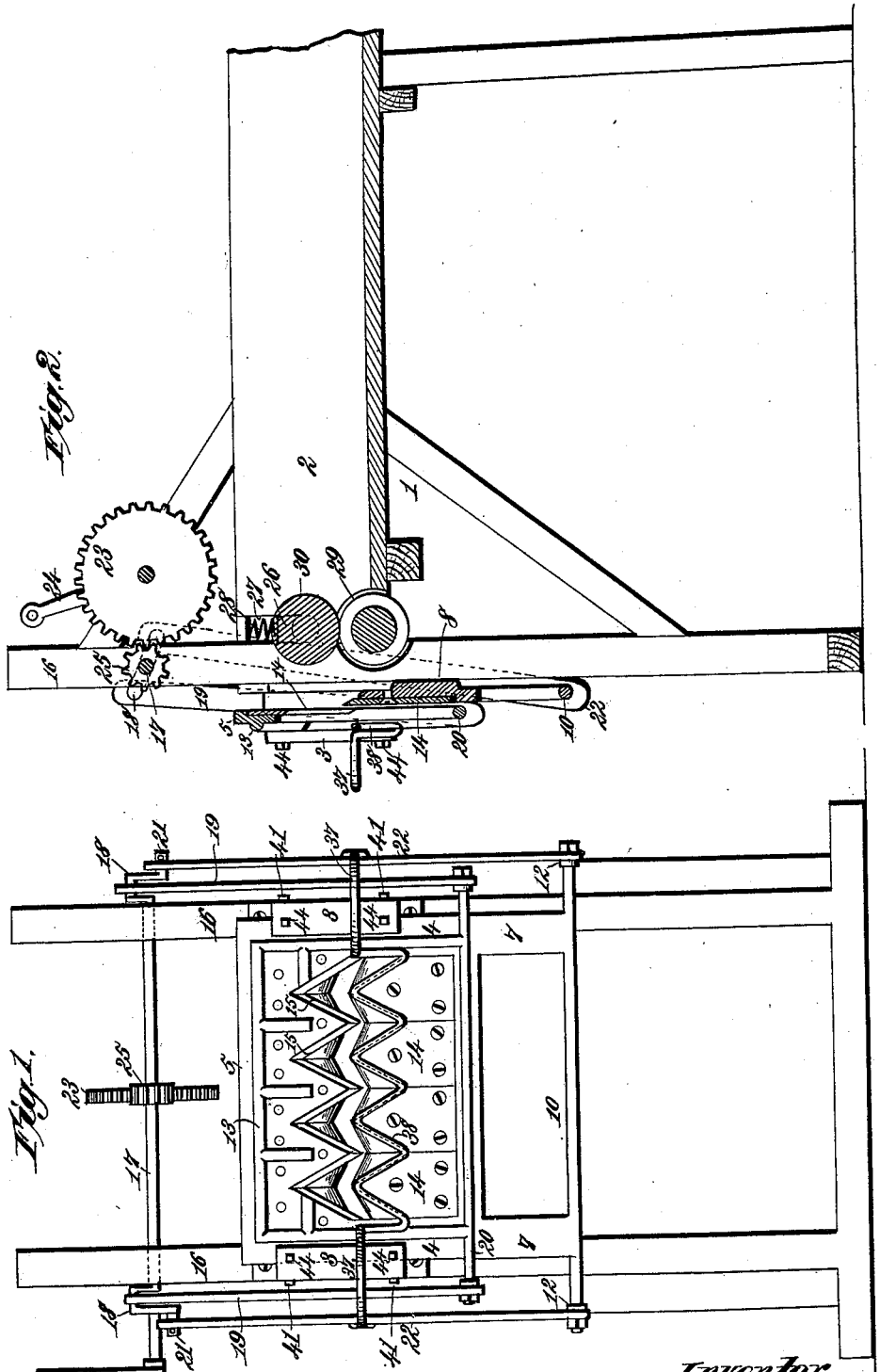
Witnesses
Robert Emmett
J. A. Rutherford
Inventor
William C. Bayless
By James L. Norris
Atty (No Model.) 3 Sheets—Sheet 2.

W. C. BAYLESS.
STRAW CUTTER.

No. 404,379. Patented June 4, 1889.

Witnesses.
Robert Garrett,
J. A. Rutherford.

Inventor:
William C. Bayless.
By James L. Norris.
Atty.

(No Model.) 3 Sheets—Sheet 3.
W. C. BAYLESS.
STRAW CUTTER.
No. 404,379. Patented June 4, 1889.
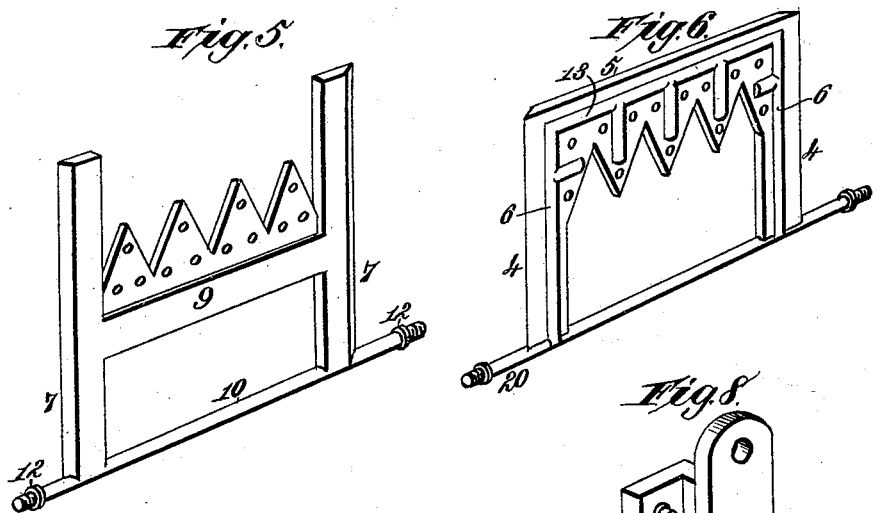
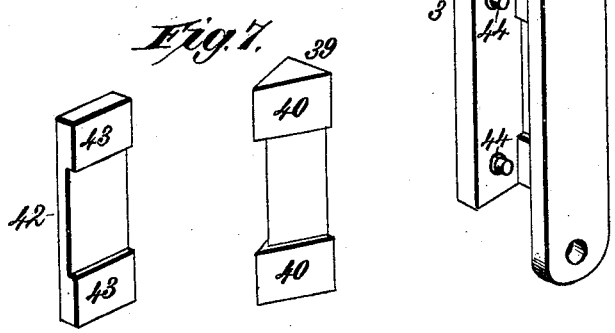
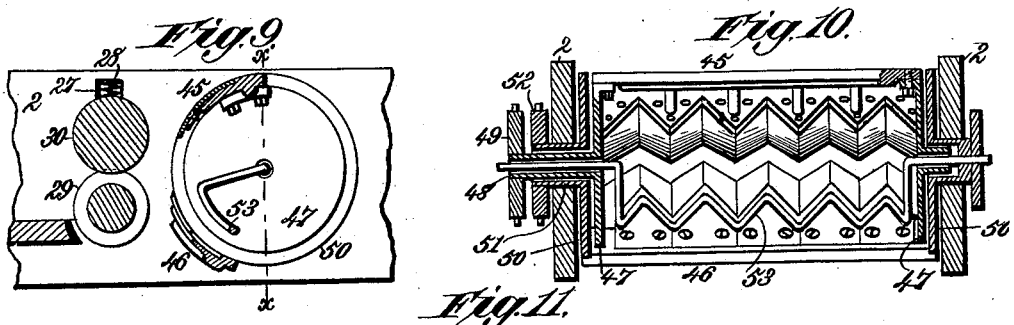
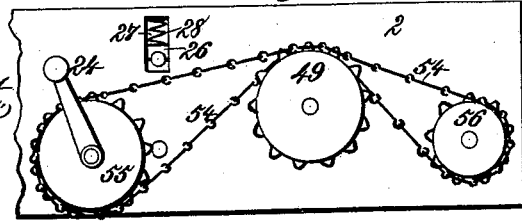
Witnesses,
Robert Pratt
J. A. Rutherford
Inventor:
William C. Bayless.
By James L. Norris
Atty.

UNITED STATES PATENT OFFICE.

WILLIAM CHARLES BAYLESS, OF MOSSY CREEK, TENNESSEE.

STRAW-CUTTER.

SPECIFICATION forming part of Letters Patent No. 404,379, dated June 4, 1889.

Application filed July 14, 1888. Serial No. 279,911. (No model.)

*To all whom it may concern:*

Be it known that I, WILLIAM CHARLES BAYLESS, a citizen of the United States, residing at Mossy Creek, in the county of Jefferson and State of Tennessee, have invented new and useful Improvements in Straw-Cutters, of which the following is a specification.

My invention relates to straw-cutters; and the purpose thereof is to provide a strong and simple construction and combination of parts whereby the cutting-edges of the knives act at all times in parallelism and produce a shearing cut of great power and in such manner as to cause or tend to cause a rotary movement of the stalks acted upon.

It is a further purpose of my invention to combine with the cutting-blades means whereby one may be adjusted relatively to the other with great accuracy to regulate the shear cut, and to provide a novel form of feed-rollers having an outline similar or approximating in shape to the form of the dentated cutting-edges of the knives, said rolls having an intermittent rotation which may be varied to produce a long or a short cut.

It is my purpose, also, to combine with the cutting devices a novel bracing-bar board or support conforming in its shape to the form of the cutting-edges of the knives and adapted to support the protruding ends of the straw as they are acted upon by the cutters to prevent them from bending or breaking down when struck by the knives, said brace-bar or board being capable of adjustment relatively to said knives.

It is my purpose, finally, to simplify and improve the construction and operation of mechanism of this class to afford a simple and ready adjustment of the feed and impart increased strength and power to the mechanism by which opposite reciprocation is imparted to the knives.

The invention consists to these ends in the several novel features of construction and new combinations of parts, hereinafter fully set forth, and then definitely pointed out in the claims.

Figure 3:
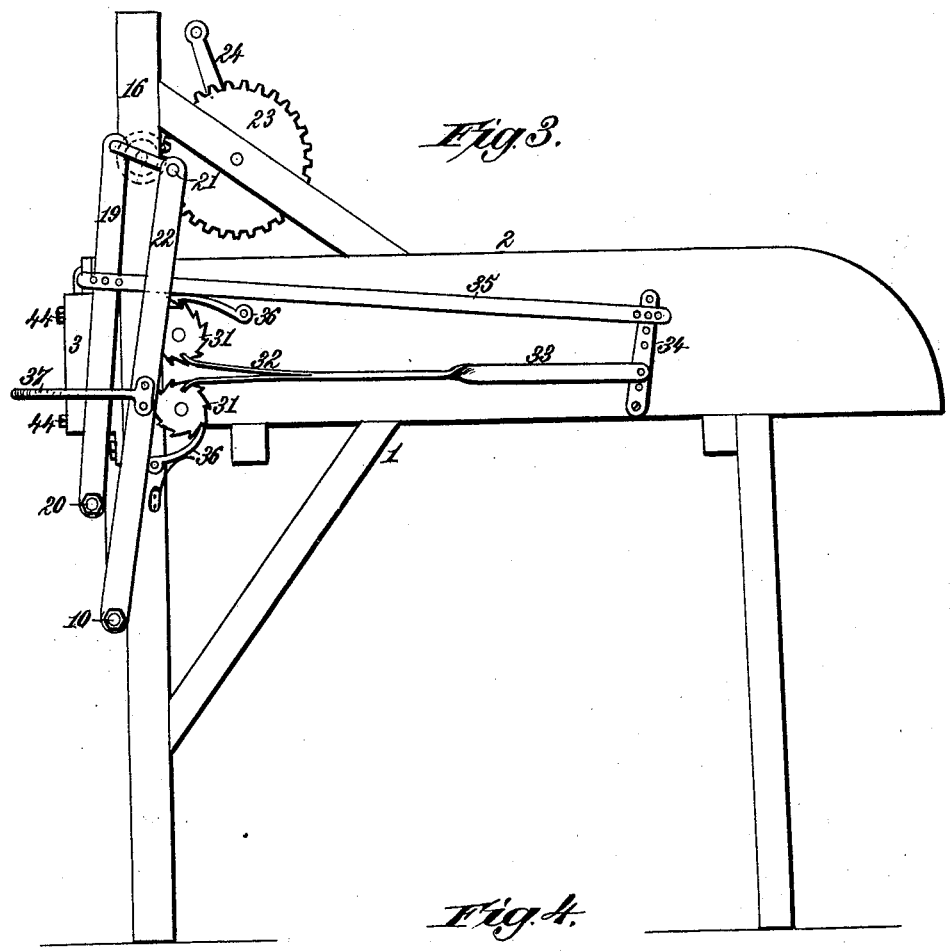
Figure 4:
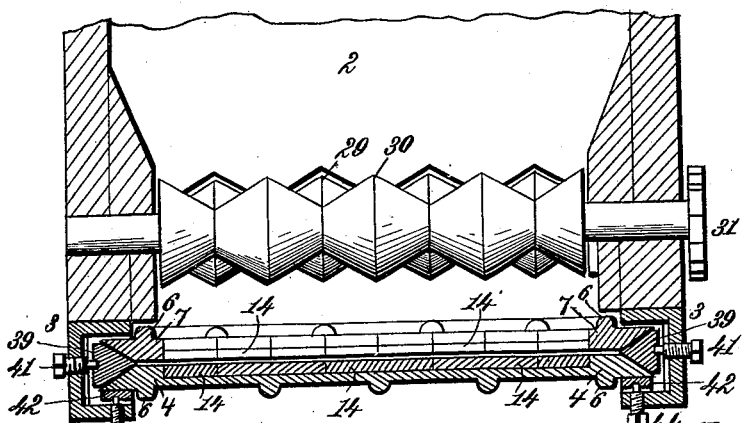

In the accompanying drawings, Figure 1 is a front elevation of a straw-cutter embodying my invention. Fig. 2 is a central vertical section of the same. Fig. 3 is a side elevation of the machine. Fig. 4 is a horizontal section, enlarged, of the front end of the machine, showing the wedge-adjuster and setting-plate with a portion of the frame. Fig. 5 is a detail perspective view of the lower cutter head or frame. Fig. 6 is a similar view of the upper cutter-head. Fig. 7 is a detail perspective showing one of the setting-plates and one of the shear-adjusting wedges detached. Fig. 8 is a detail perspective showing one of the casings forming guides for the cutter-heads. Fig. 9 is a central vertical section showing a modification in construction. Fig. 10 is a vertical section on the line $xx$, Fig. 9. Fig. 11 is a side elevation showing the sprockets actuating the rotary cutters illustrated in Figs. 9 and 10.

In the said drawings, the reference-numeral 1 designates the supporting-frame of the machine, upon which is mounted the box 2, said parts being of the usual construction. Upon the forward end of the box 2, at each side thereof, is mounted a cast-iron casing or frame 3, having three walls arranged in rectangular form, the open sides being turned inward. These casings are parallel with each other and firmly bolted to the box. Within these casings 3 move the ends of the frames which carry the upper and lower knives. These frames consist of parallel strips 4, connected at their upper ends by a cross-bar 5 having the form substantially as shown in Fig. 6. The parallel strips 4 are of sufficient width to enter the casings or guides 3, a rib 6 being formed upon and projecting from the outer face of each strip to give it strength. The inner angle of each vertical strip 4 is beveled, as shown in Fig. 4, for a purpose presently to be shown.

The lower knife is carried by a frame having parallel arms or strips 7, provided upon their outer faces with ribs 6, similar to those on the strips 4, and each arm 7 is beveled upon the inner angle, as shown in Fig. 5. A cross-brace 9, having substantially the construction of the bar 5, connects the parallel arms 7, which extend some distance below said cross-brace, and are connected by a shaft 10, the ends of which project beyond the casings 3, and are provided with collars 12. Both the cross-braces 5 and 9 are provided with strengthening-ribs 13.

The knives are each composed of a steel plate 14, formed with a line of cutting-dentations 15, those of one plate alternating with and passing by those of the other plate when the knives are simultaneously moved toward each other. In uprights 16 is journaled a shaft 17, having a double crank at each end outside the uprights. The inner cranks 18 are connected by pitman 19 with a shaft 20, which connects the lower ends of the parallel strips 4 of the frame carrying the upper knife. The outer cranks 21, which have a throw opposite to that of the inner cranks, are similarly connected by longer pitman 22 to the projecting ends of the shaft 10. The crank-shaft 17 may be driven by a gear 23, actuated by a crank 24 and meshing with a smaller pinion 25 on the shaft 17. Immediately behind the cutters are arranged the feed-rolls, the lower being journaled in stationary bearings, while the journals of the upper roll are carried by movable boxes 26, which are normally forced downward in ways 27 by springs 28. Each of these rolls is provided with a series of annular bosses, each in the form of inverted letter V, thus forming a series of V-shaped bosses and depressions, which correspond in outline with the dentations of the knives. The annular bosses 29 on the lower feed-roller enter the V-shaped depressions of the upper feed-roller, and, likewise, the annular bosses 30 on the upper roller enter the depressions of the lower one. Upon the end of each roll-shaft is mounted a ratchet 31, with which a pawl 32 engages. The two pawls operating the feed-rolls are carried by a single arm 33, pivotally connected to a lever 34, fulcrumed upon the box and driven by a pitman 35, connected to one of the pitmen operating the upper knife. The pitman 35 is adjustably connected at both ends, so that by varying the point of connection the throw of the lever 34 may be varied and the feed of the rolls adjusted. The pawl carrying arm 33 is also adjustably connected to the lever 34 for a similar purpose. Holding-pawls 36 are mounted upon the box and thrown by springs in engagement with the ratchets 31 to prevent backlash of the feed-rolls.

Upon the pitmen 22 are mounted forwardly-projecting elastic supports 37, upon which is a zigzagged bar 38, which may be formed of a bar or board bent or otherwise formed to approximate the angular arrangement of the cutting-edges of the knives. Being carried by the pitmen operating the lower cutter-frame, the brace-bar will rise and fall with the latter, and as the knives approach the point of operative contact the brace-bar is swung by the pitmen 22 toward and near the outer face of the lower knife, where it underlies the projecting ends of the straw and supports the same during the action of the knives, thereby insuring a perfect and complete cut.

Within the casings 3, I arrange shear-setting wedges 39. (Shown in detail in Fig. 7.) Each of these devices consists of triangular mass metal having a central portion cut away upon the converging sides to leave end bearing portions 40. The angle of convergence of these wedges is such as substantially fit the angle caused by the two adjacent bevels upon the vertical arms of the cutter-frames, and the wedges are held in place and adjusted by set-screws 41, tapped through the casings 3 and having their ends swiveled in the backs of the wedges. Within each casing 3, I also arrange setting-plates 42, Fig. 7, having bearing-faces 43 at each end. These plates have bearing upon the outer face of the parallel arms 4 of the upper knife-frame, and are adjusted relatively thereto by set-screws 44, tapped through the wall of the casing 3, the ends of the screws having nipples which engage the plate. It will readily be seen that by means of these setting plates and wedges a very delicate and accurate adjustment may be given to the cutters to insure a proper shearing cut and prevent undue friction upon the edges.

The principle embodied in my invention may be carried into effect by the modified construction shown in Fig. 9, wherein the cutters have continuous rotary movement instead of rectilinear reciprocation.

By my invention the straw is brought between the two angular cutting-edges, which both act at the same time throughout every portion of said edges, thereby applying the power to the greatest possible advantage, while the work is easily and speedily performed. Moreover, by the action of the distributing-rolls, the straw is arranged and presented in substantially equal volume or quantity to each portion of the cutting-edge, preventing unequal strain and tendency to lateral binding of the cutters, promoting uniform wear, and greatly facilitating the labors of the operator, besides enabling the knives to make a clean perfect cut instead of partly cutting and partly breaking the straw down and wedging it between the cutters. I provide, also, simple and readily-operated means whereby the feed may be adjusted to a long cut or short cut.

I may substitute for the directly-reciprocating cutters shown in Figs. 1 to 6, inclusive, the rotary cutters shown in Figs. 9 to 11, inclusive. In these figures the numeral 2 denotes the feed-box, having the distributing-rolls 29 and 30. In front of these rolls I place the dentated knives 45 and 46, the former being mounted upon and carried by disks 47, which are part of the sleeves 48, projecting through the walls of the box, one of said sleeves having a sprocket 49. The other cutter-head 46 is mounted upon and carried by disks 50, said disks having tubular projections 51 passing through the walls of the feed-box and having mounted upon one end thereof a sprocket 52. The zigzagged bracing-bar 53, which corresponds with the bar 38, already described, is rigidly connected to and turns with the knife 46, and both knives are driven by a sprocket-chain 54 passing from idlers 55 and 56 over the sprockets 49 and 52, whereby rotary movement in opposite directions is given to said cutter-heads. In all other respects save those specified the invention is the same as that set forth in the description already given.

What I claim is—

1. The combination, in a straw-cutter, of two opposing knives, one movable toward the other and each comprising a series of cutting-dentations, with those of one knife alternating with and adapted to pass those of the other, a feed-box, and a bracing-support having a zigzagged portion corresponding substantially to the dentations of one knife to sustain the straw as the knives sever the same, substantially as described.

2. The combination, in a straw-cutter, of a feed-box, two opposing knives, one movable toward the other and each comprising a series of cutting-dentations, with those of one knife alternating with and adapted to pass those of the other, a pair of feed-rolls, each having a series of annular depressions, and a bracing-support having a zigzagged portion corresponding substantially to the dentations and depressions of one knife and roller to sustain the straw as the knives sever the same, substantially as described.

3. The combination, in a straw-cutter, of the feed-box for the straw, a pair of knives movable toward each other and each composed of a metallic plate formed with a series of cutting-dentations, with those of one plate alternating with and adapted to pass those of the other, a pair of feed-rollers, each having a series of annular V-shaped bosses and corresponding depressions alternating with each other and conforming substantially to the dentations of the knives, and means for simultaneously moving the knives toward each other, substantially as described.

4. The combination, in a straw-cutter, of the feed-box, the knives movable toward each other and each composed of a metallic plate having a series of cutting-dentations, with those of one plate alternating with those of another, and a zigzagged bar corresponding substantially to the form of the dentated knives and movable toward one knife to support the protruding ends of the straw as the knives act thereupon, substantially as described.

5. In a straw-cutter, the combination, with vertically-reciprocating cutter-frames moving in parallel ways, of shear-setting wedges lying in an angular recess between the vertical arms of said frames and adjusted by set-screws to force said frames apart and setting-plates lying against the outer faces of two parallel arms of one of said frames and having adjusting-screws, substantially as described.

6. In a straw-cutter, the combination, with reciprocating cutters, each having a serrated or angular edge alternating with the serrations of the other cutter, of a pair of distributing feed-rolls having outlines resembling the outline of the cutting-edge and arranged to have a similar alternation, substantially as described.

7. In a straw-cutter, the combination, with a pair of cutters, each having a serrated or angular edge alternating with the serrations or angles of the opposite edge, of a brace-bar or board moving with the lower knife-frame, said bar being of a shape conforming to the cutting-edge of the lower cutter and arranged to lie beneath said edge, substantially as described.

8. In a straw-cutter, the combination, with a pair of cutters having serrated edges, the angles of one alternating with those of the other, of a brace-bar or board mounted on elastic supports carried by the lower cutter, the said bar conforming in shape to the angles of the cutting-edge, whereby it moves with and is drawn toward the lower cutter, beneath or opposite to the edge of which it lies as the knives operate, substantially as described.

9. In a straw-cutter, the combination, with a pair of cutters, each composed of a series of blades having two converging edges, of means, substantially as described, for imparting opposite reciprocation to both cutters, the cutting-edges of the one alternating with those of the other, a pair of distributing feed-rolls having bosses or corrugations which substantially correspond with the serrations of the upper and lower cutters, respectively, and a pawl-carrier reciprocated by a pitman actuated by one of the devices driving the cutters and having pawls meshing with ratchets on the ends of the feed-rolls, the pawl-carrier and pitman being either or both adjustable toward and from the point of support of the devices to which they are connected to shorten and lengthen the feed movement of the rolls, substantially as described.

10. In a straw-cutter, the combination, with the uprights of the cutter-box having parallel casings, of independent cutter-frames having their vertical arms moving in said casings and provided with ribs on their exterior faces and beveled upon their adjacent vertical angles, adjustable wedges lying in the angular space formed by said bevels, adjustable setting-plates bearing upon the outer faces of the vertical arms of one frame, and means for adjusting said wedges and setting-plates relatively to each other, substantially as described.

In testimony whereof I affix my signature in presence of two witnesses.

WILLIAM CHARLES BAYLESS.

Witnesses:
   D. S. CANAWAY,
   JOHN BRADSHAW.